United States Patent [19]
Hamada et al.

[11] Patent Number: 5,356,283
[45] Date of Patent: Oct. 18, 1994

[54] METAL MOLD FOR SEALING SEMICONDUCTOR DEVICES WITH A RESIN

[75] Inventors: Makoto Hamada; Hiroshi Ise, both of Tokyo, Japan

[73] Assignee: NEC Corporation, Tokyo, Japan

[21] Appl. No.: 136,081

[22] Filed: Oct. 14, 1993

[30] Foreign Application Priority Data
Oct. 14, 1992 [JP] Japan .................. 4-275761

[51] Int. Cl.⁵ .............. B29C 45/02; B29C 45/14; B29C 45/38; B29C 45/42
[52] U.S. Cl. .................. 425/544; 425/556; 425/436 R; 425/444; 425/DIG. 51; 425/DIG. 228; 264/272.17; 264/328.9
[58] Field of Search ............ 425/DIG. 51, DIG. 228, 425/544, 556, 588, 444, 436 R, 116, 121, 563; 264/272.17, 328.9

[56] References Cited
U.S. PATENT DOCUMENTS

| | | |
|---|---|---|
| 4,466,934 | 8/1984 | Cane et al. ............ 264/328.9 |
| 4,723,899 | 2/1988 | Osada ..................... 425/544 |
| 5,074,779 | 12/1991 | Tsutsumi et al. ........ 425/556 |
| 5,141,430 | 8/1992 | Mans et al. ............. 425/556 |

FOREIGN PATENT DOCUMENTS

| | | | |
|---|---|---|---|
| 59-171632 | 9/1984 | Japan ............. 425/DIG. 51 |
| 62-13037 | 1/1987 | Japan . |
| 62-116123 | 5/1987 | Japan ............. 425/DIG. 51 |
| 63-82718 | 4/1988 | Japan ............. 425/544 |
| 41980 | 3/1991 | Japan . |
| 1260231 | 9/1986 | U.S.S.R. ........... 425/DIG. 51 |

*Primary Examiner*—Khanh Nguyen
*Attorney, Agent, or Firm*—Young & Thompson

[57] ABSTRACT

A metal mold for sealing a semiconductor device with a resin and including a shutter gate mechanism. The mold drives a shutter gate pin by using the ejection stroke of a conventional seal press, and therefore eliminates the need for an extra drive source. It follows that the mold can be implemented only if an existing facility is slightly modified, and it is lower in cost than conventional metal molds.

1 Claim, 8 Drawing Sheets

METAL MOLD FOR SEALING SEMICONDUCTOR DEVICES WITH A RESIN

BACKGROUND OF THE INVENTION

The present invention relates to a semiconductor production facility and, more particularly, to a metal mold for sealing semiconductor devices with a resin and including a shutter gate mechanism.

Generally, semiconductor devices sealed with a resin, i.e., so-called plastic ICs (Integrated Circuits) are produced by a metal mold. A metal mold for this kind of application may be provided with a shutter mechanism at a gate thereof which forms a resin passageway and a resin inlet port, as disclosed in Japanese Patent Publication No. 41980/1991 and Japanese Patent Laid-Open Publication (Kokai) No. 13037/1987 by way of example. However, the conventional metal mold with a shutter mechanism has some problems left unsolved, as follows. A shutter included in the mechanism cannot be driven without resorting to a complicated drive arrangement. An exclusive drive source for the shutter has to be built in a lower mold forming a part of the metal mold, complicating the mold configuration and increasing the cost.

SUMMARY OF THE INVENTION

It is, therefore, an object of the present invention to provide a meal mold free from the problems particular to the conventional metal mold as discussed above.

In accordance with the present invention, a metal mold for sealing with a resin a lead frame loaded with semiconductor devices and undergone wire bonding comprises a shutter gate pin forming a part of a cavity for forming a package, and a part of a gate constituting a resin inlet port, a shutter plate on which the shutter gate pin is studded, a knock-out rod for selectively moving the shutter plate upward or downward and causing the shutter gate pin to selectively block or unblock the gate, and a support bolt forming a part of the shutter plate and adjusting the depth of the gate which defines the size of the resin inlet port, whereby the ejection stroke of a seal press is used to drive the shutter gate pin.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
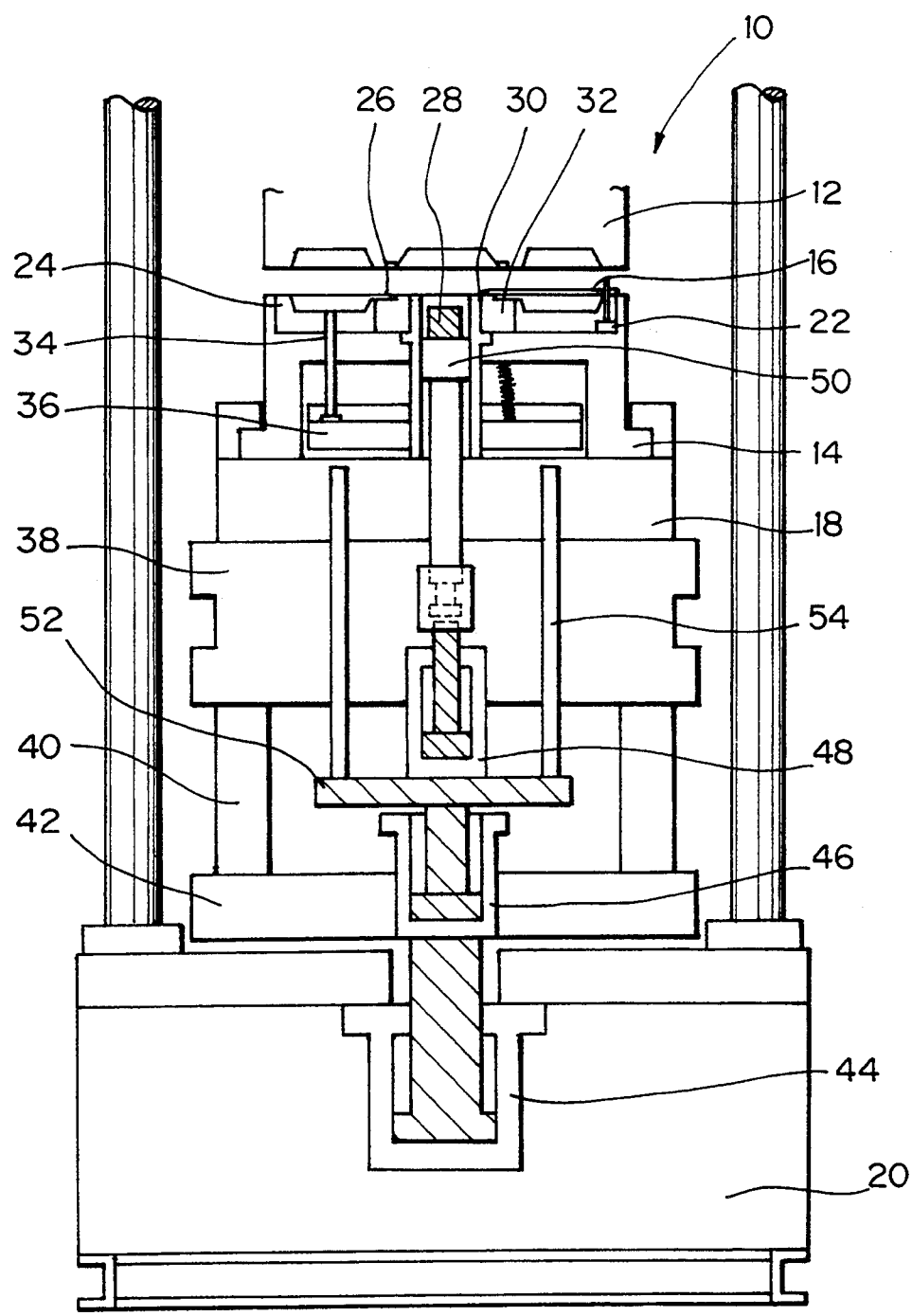
FIG. 1 is a section of a conventional metal mold.

To better understand the present invention, a brief reference will be made to a conventional metal mold of the kind concerned, shown in FIG. 1. As shown, the mold, generally 10, is made up of an upper mold 12 and a lower mold 14 for pressing a lead frame 16 undergone tie bonding or wire bonding. The mold 10 is securely mounted on a sealing device 20 via a main mold 18. The sealing device 20 includes a mechanism for heating the mold 10. A gauge pin 22 is provided in the mold 10 for positioning the lead frame 16. A cavity 24 is formed in the mold 10 for forming a package, i.e., a product. A gate 26 form a passageway and an inlet port for a resin 28. The resin is delivered to the gate 26 from a pot 30. A center block 32 positions the passageway for the resin 28 and the pot 30. An ejector pin 34 ejects the product upward. The reference numeral 36 designates an ejector plate In operation, while the upper mold 12 and lower mold 14 are open, the lead frame 16 is set by the gauge pin 22, and then the resin 28 is poured into the pot 30. Subsequently, a press cylinder 44 is raised via a moving platen 38, a connecting shaft 40, and a slide frame 42. As a result, the upper mold 12 and lower mold 14 are closed. Thereafter, a plunger 50 is raised by an eject cylinder 46 and an eject subcylinder 48 to start injecting the resin 28 into the cavity 24 under pressure. The plunger 50 is left in the raised position until the resin 28 hardens, while being balanced with the pressure of the resin 28. After the resin 28 has hardened, the upper mold 12 and lower mold 14 are opened. In this condition, the eject cylinder 46 is again raised to thrust a subplate 52 upward. In response, a knock-out rod 54 studded on the subplate 52 thrusts the ejector plate 36 upward. The ejector plate 36, in turn, thrusts the ejector pin 34 upward to eject the product from the mold 10. Finally, the mold 10 is cleaned to complete a single molding cycle.

Figure 2:
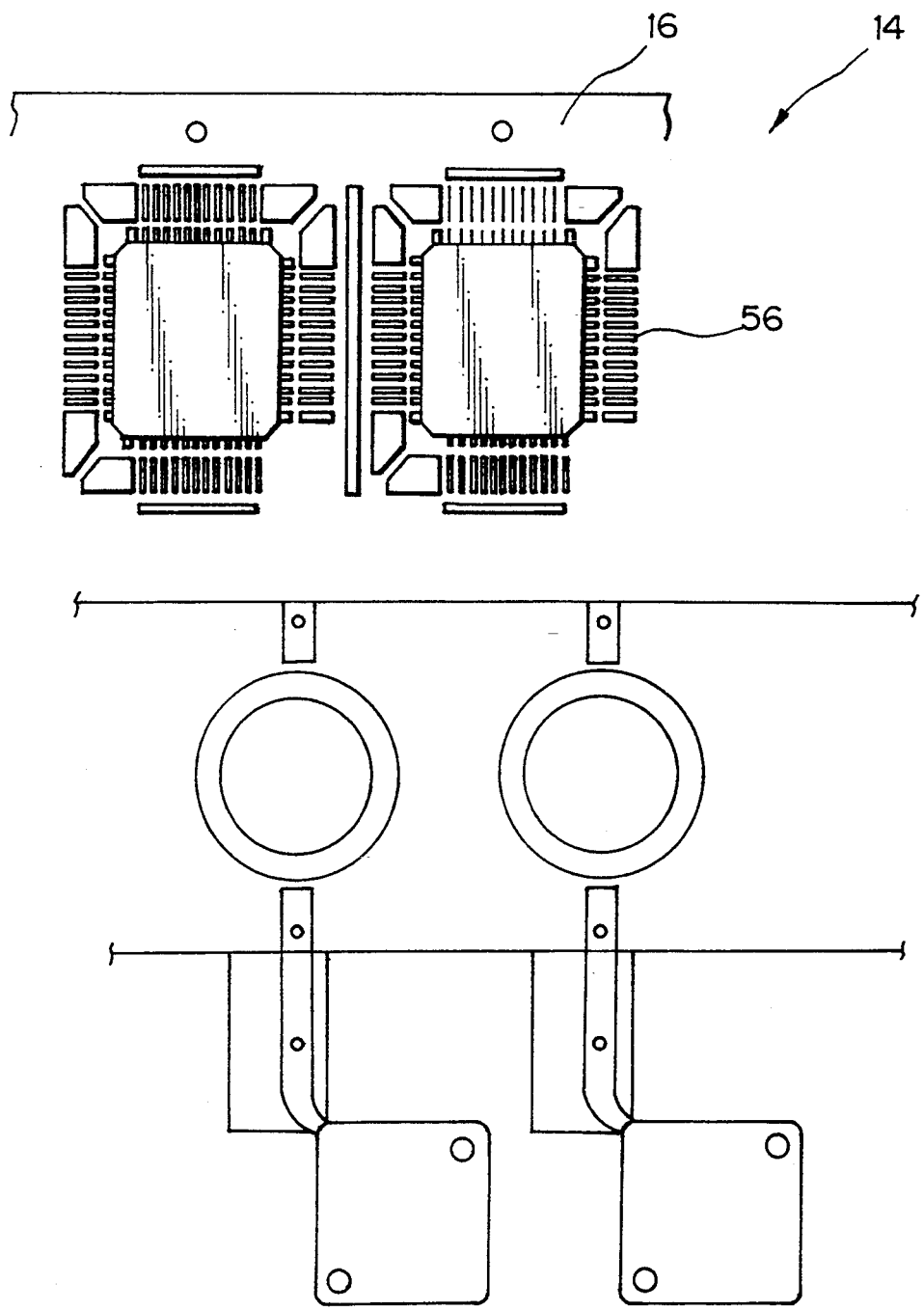
FIG. 2 is a plan view showing a lower mold included in the conventional metal mold and on which a lead frame is set.

FIG. 2 shows the lower mold 14 loaded with the lead frame 16 in a plan view. The lead frame 16 is assumed to be for a QFP application and provided with leads 56 extending in the direction of a package. Regarding this kind of lead frame, it has heretofore been accepted that injecting a resin from the corner of a package is advantageous. Today, however, the size of the corner of a package which can be rounded is severely limited due to the increasing trend toward a multipin, fine pitch lead configuration.

Figure 3A:
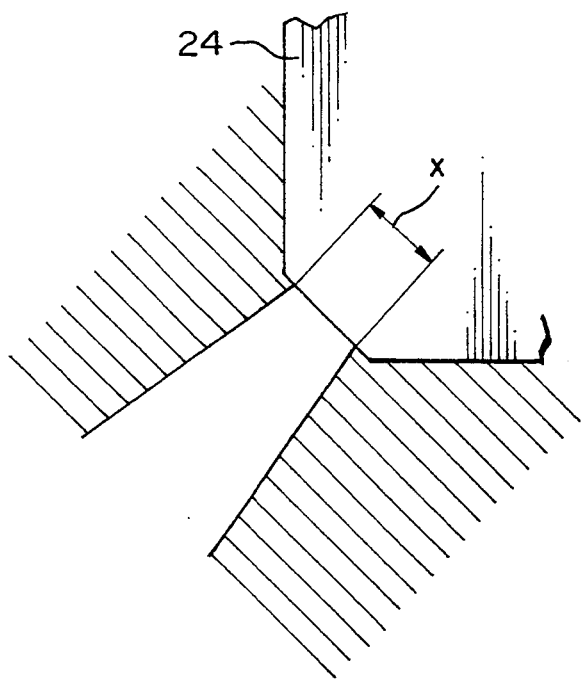
FIGS. 3A and 3B are schematic views showing a gate also included in the conventional metal mold.
Figure 3B:
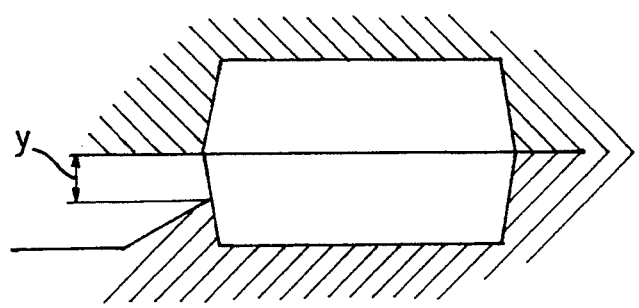

FIGS. 3A and 3B show one gate included in the conventional mold. As shown, the gate provided in the cavity 24 has a width x which is decreasing due to the above-mentioned limitation. To secure the conventional area of the gate, the depth y of the gate may be increased. This, however, brings about other various problems, e.g., causes the gate to be left in the event of flaking and causes the package to crack.

Figure 4:
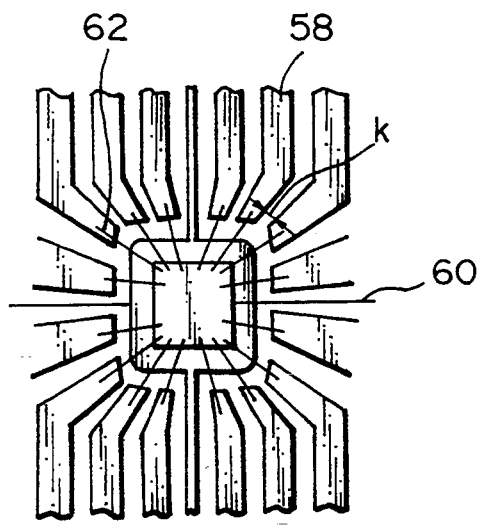
FIGS. 4 and 5 demonstrate how wires included in a package are deformed by the flow of a resin.
Figure 5:
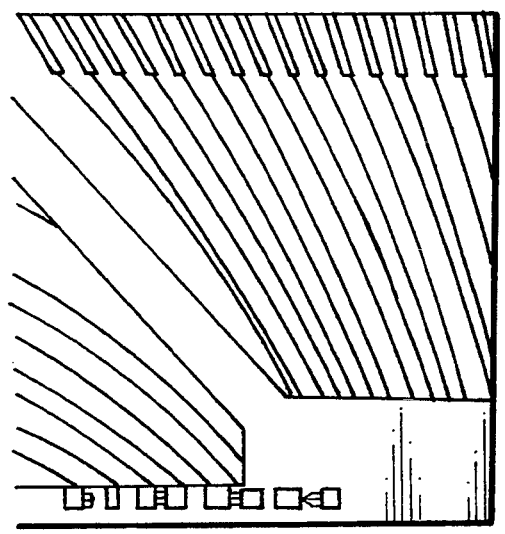

The configuration of a package is shown in FIG. 4 specifically. As shown, the lead frame 16 has inner leads 58 which are connected to a chip 60 by wires 62. The distance or gap k between nearby inner leads 58 is decreasing to meet the demand for a multi-pin, fine pitch lead arrangement. This prevents the tips of the leads 58 from bring brought close to the chip 60 due to limitations in respect of frame machining technology. As a result the wires 62 connecting the leads 58 and chip 60 have a substantial length. However, it is likely that such long wires 62 are entrained by the resin which flows during the formation of a package. The resulting deformation of the wires 62 often exceeds the allowable limit. FIG. 5 illustrates the deformation of the wires 62 specifically.

Figure 6A:
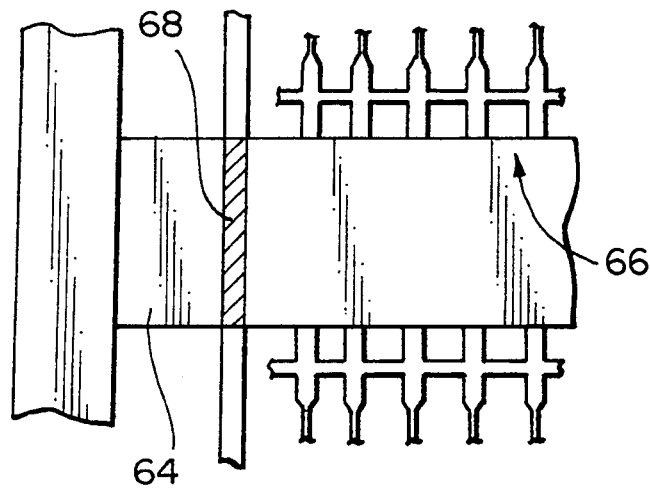
FIGS. 6A and 6B are views showing a conventional metal mold having a shutter mechanism.
Figure 6B:
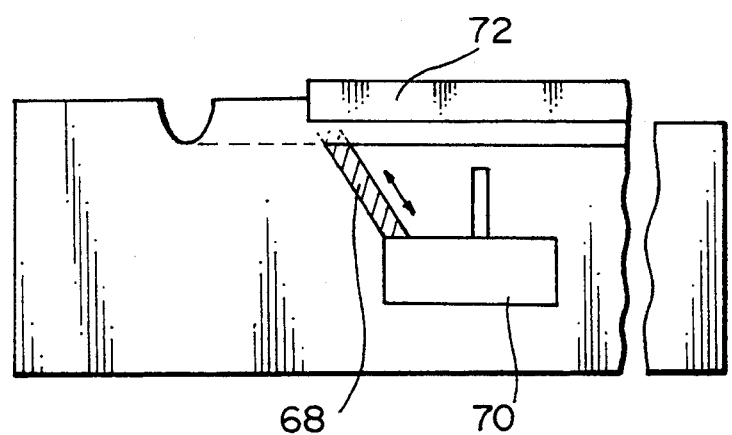

In the light of the above, Japanese Patent Publication No. 41980/1991 proposes a mold having a gate provided with a shutter mechanism. Specifically, as shown in FIGS. 6A and 6B, a gate 64 has the same width and the same depth as a cavity 66. A shutter 68 is located at a position where the gate 64 adjoins the cavity 66. The shutter 68 is mounted on an ejector plate 70 and held in an unblocking position before the injection of a resin. After a resin has been injected into the cavity 66, the shutter 68 blocks the gate 64 due to the elevation of the ejector plate 70, while leaving a gap between it and a lead frame 72. However, this kind of approach is disadvantageous for the following reasons. Since the shutter 68 is moved in the oblique direction to form a part of the cavity 66, a complicated drive mechanism is needed. Moreover, an advanced technique is needed in guiding the shutter 68 in such a direction.

Figure 7:
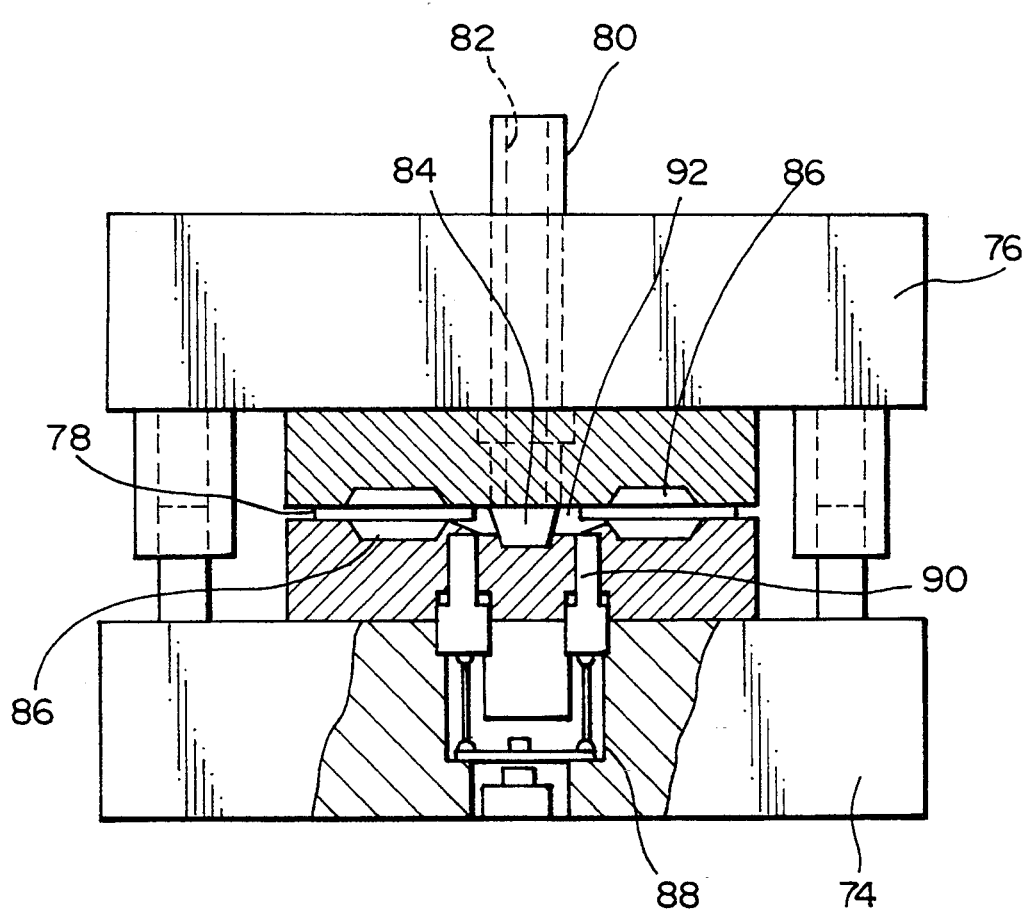
FIG. 7 is a fragmentary section of another conventional metal mold having a shutter mechanism.
Figure 8:
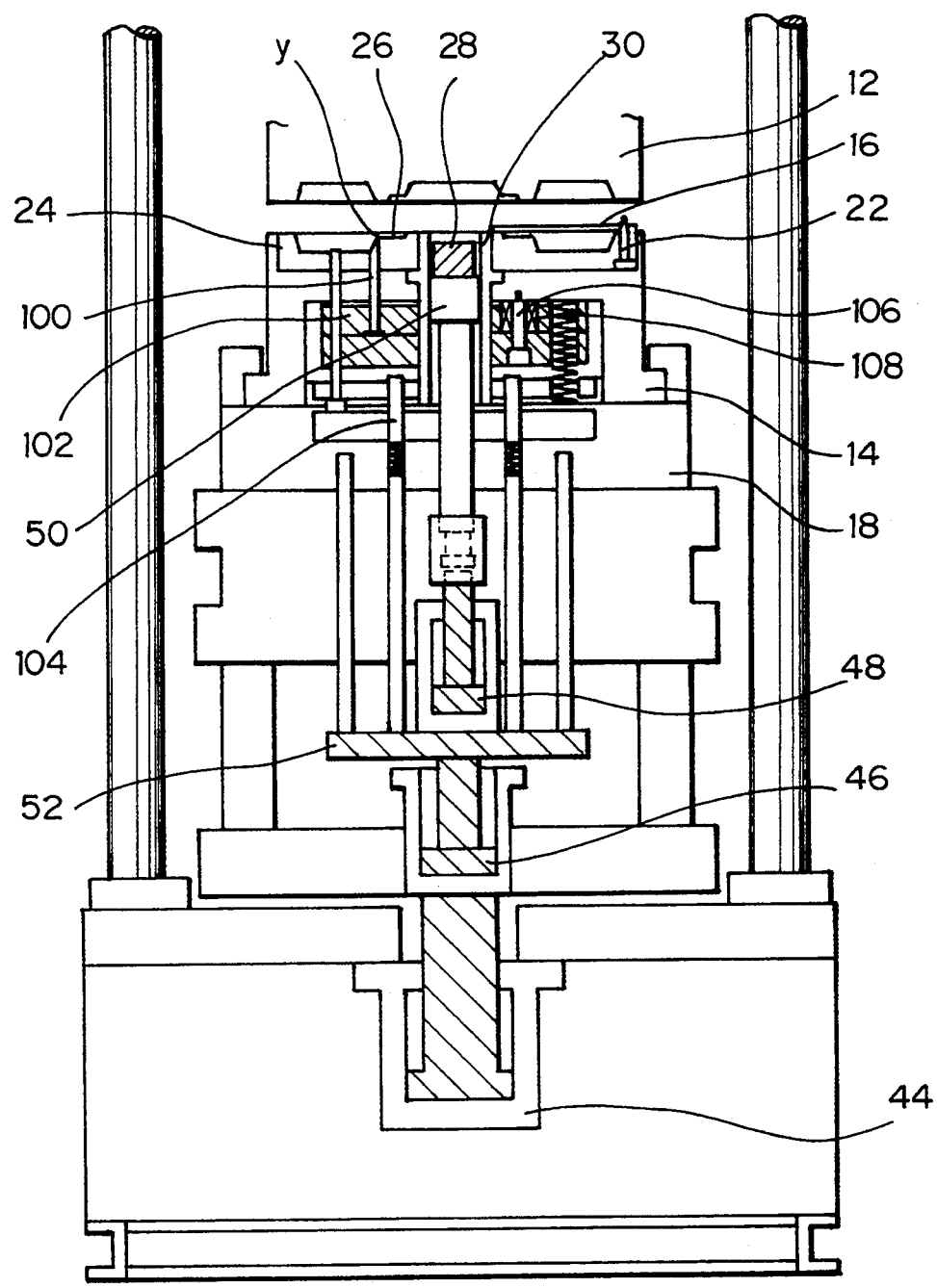
FIG. 8 is a section showing a metal mold embodying the present invention.

To eliminate the above problems, Japanese Patent Laid-Open Publication (Kokai) No. 13037/1987 teaches an arrangement wherein a shutter is driven in the vertical direction, as shown in FIG. 7. As shown, a mold is made up of a lower mold 74 and an upper mold 76. After the two molds 74 and 76 have pressed a lead frame 78 therebetween, a resin is poured into a transfer pot 80. Then, a plunger 82 compresses the resin and injects it into a cavity 86 from the pot 84. Subsequently, a shutter 90 is caused to protrude by a driving device 88, thereby removing the resin existing at a gate 92. However, the drawback with this implementation is that a drive source for the plunger 82 and a drive source for the shutter 90 have to be built in the upper mold 76 and lower mold 74, respectively, complicating the arrangements of the coactive molds 74 and 76. Moreover, the two drive sources increase the cost of the mold. In addition, the shutter 90 cannot be driven unless it is connected to a cylinder included in a sealing device. Therefore, when the kind of products is changed, such a mold needs a longer period of time for replacement than the other kinds of molds.

Referring to FIGS. 8 and 9A-9D, a metal mold embodying the present invention is shown. In the figures, constituent parts functioning in the same manner as the parts shown in FIG. 1 are designated by the same reference numerals, and a detailed description will not be made to avoid redundancy. As shown, the mold has a gate 26 serving as a resin inlet port, a cavity 24 for forming a package, and a shutter gate pin 100 forming a part of the gate 26 and a part of the cavity 24. The shutter gate pin 100 is studded on a shutter plate 102. A knock-out rod 104 causes the shutter plate 102 to move up and down and causes the shutter gate pin 100 to open and close the gate 26. A support bolt 106 forms a part of the shutter plate 102 and adjusts the depth y of the gate 26, i.e., the size of the resin inlet port. The support bolt 106 moves the shutter plate 102 up and down to locate the shutter gate pin 100 at a desired position, thereby changing the depth y of the gate 26. As a result, the flow rate of a resin flowing through the gate 26 is adjusted.

In operation, the shutter pin 100 is constantly biased by a return spring 108 to a lower limit position which maintains the gate 26 in an unblocked position. While an upper mold 12 and a lower mold 14 are open, a lead frame 16 is positioned on the mold by a gauge pin 22, and then a resin 28 is poured into a pot 30. Subsequently, the upper mold 12 and lower mold 14 are closed. Then, a plunger 50 is raised by an eject cylinder 46 and an eject subcylinder 48, starting injecting the resin 28 into the cavity 24 under pressure. As soon as the cavity 24 is filled with the resin 28, the plunger 50 is balanced with the pressure of the resin 28 and brought to a stop. The cylinder 46 is continuously raised with the result that the knock-out rod 104 pushes the shutter plate 102 upward. Consequently, the shutter gate pin 100 is raised to block the gate 26 and held in the blocking position for a predetermined period of time. After the resin 28 has hardened, the mold is opened. This is followed by a sequence of steps described in relation to the conventional mold.

In the illustrative embodiment, the knock-out rod 104 for thrusting the shutter gate pin 100 upward is mounted on a subplate 52 included in a conventional seal press. Hence, a mold with a shutter gate can be implemented easily only if the shape of a main mold 18 is modified.

Figure 9A:
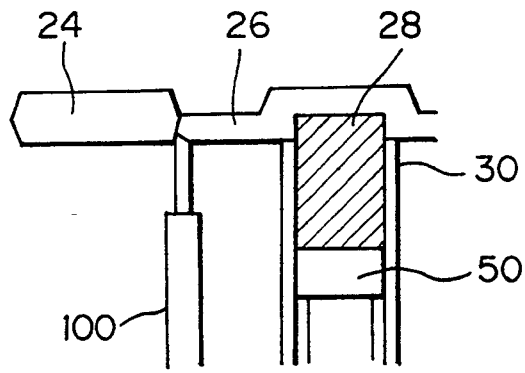
FIGS. 9A-9D are fragmentary views demonstrating the movement of a shutter gate pin included in the embodiment and the injection of a resin.
Figure 9B:
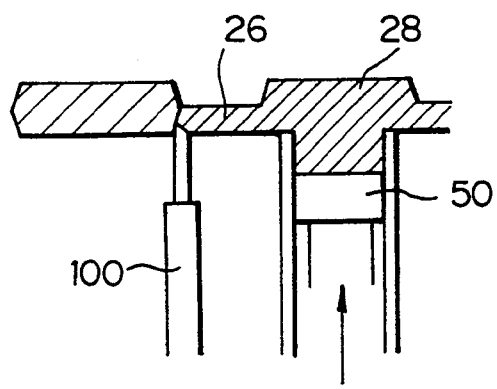
Figure 9C:
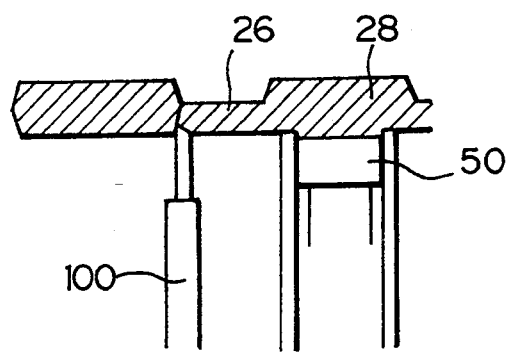
Figure 9D:
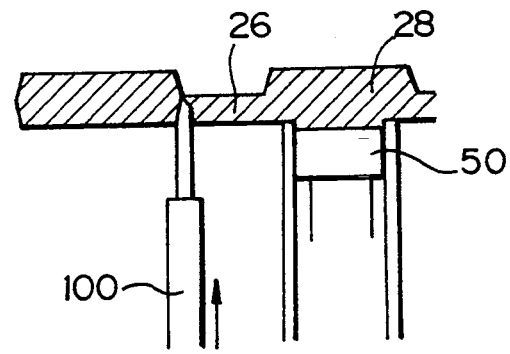

A reference will be made to FIGS. 9A-9D for describing the movement of the shutter gate pin 100 and the injection of the resin 28. When the mold is closed with the resin 28 introduced into the pot 30, the gate 26 remains in an unblocking position (FIG. 9A). In this condition, the eject cylinder 46 raises the plunger 50 to force the resin 28 into the cavity 24. At this instant, the gate 26 still remains in the unblocking position (FIG. 9B). The plunger 50 is further raised until it has been brought into balance with the pressure of the resin 28 filling the cavity 24, and then it is stopped (FIG. 9C). On the other hand, the eject cylinder 46 is continuously raised to start raising the shutter gate pin 100. As a result, the shutter gate pin 100 rises until it fully blocks the gate 26 (FIG. 9D). It is noteworthy that the shutter gate pin 100 starts rising after the resin 28 has filled up the cavity 24, allowing the pressure of the resin to be fully shut off.

While the embodiment has been shown and described in relation to a QFT metal mold, the present invention is, of course, applicable to all the resin sealing technologies available today.

In summary, it will be seen that the present invention provides a metal mold which drives a shutter gate pin by using the ejection stroke of a conventional seal press, and therefore eliminates the need for an extra drive source. It follows that the mold of the present invention can be implemented only if an existing facility is slightly modified, and it is lower in cost than conventional metal molds. Furthermore, the mold of the present invention includes a support bolt for adjusting the depth of a gate. With the support bolt, it is possible to increase the area of the gate in the event of injection of a resin, i.e., to lower the flow rate of the resin. This is successful in reducing the deformation of long wires.

Various modifications will become possible for those skilled in the art after receiving the teachings of the present disclosure without departing from the scope thereof.

What is claimed is:

1. A metal mold for sealing with a resin a lead frame loaded with semiconductor devices and undergone wire bonding, comprising:

a shutter gate pin forming a part of a cavity for forming a package, and a part of a gate constituting a resin inlet port;

a shutter plate on which said shutter gate pin is studded;

a knock-out rod for selectively moving said shutter plate upward or downward and causing said shutter gate pin to selectively block or unblock said gate; and a support bolt forming a part of said shutter plate and adjusting a depth of said gate which defines a size of said resin inlet port;

whereby an ejection stroke of a seal press is used to drive said shutter gate pin.

* * * * *